United States Patent [19]

Osafune et al.

[11] Patent Number: 4,786,302
[45] Date of Patent: Nov. 22, 1988

[54] METHOD OF PREPARING TUBULAR SILICA GLASS

[75] Inventors: Haruo Osafune; Sadao Kanbe; Teiichiro Mori; Masahisa Ikejiri, all of Nagano, Japan

[73] Assignee: Seiko Epson Corporation, Tokyo, Japan

[21] Appl. No.: 72,503

[22] Filed: Jul. 13, 1987

Related U.S. Application Data

[63] Continuation-in-part of Ser. No. 782,333, Oct. 1, 1985, Pat. No. 4,680,045.

[30] Foreign Application Priority Data

Oct. 4, 1984 [JP] Japan .................. 59-208917
Feb. 13, 1985 [JP] Japan .................. 60-26002

[51] Int. Cl.$^4$ ............................ C03B 37/023
[52] U.S. Cl. ................. 65/3.11; 65/3.12; 65/17; 65/18.1
[58] Field of Search ............ 65/3.11, 3.12, 17, 18

[56] References Cited

U.S. PATENT DOCUMENTS

| | | | |
|---|---|---|---|
| 3,853,521 | 12/1974 | Greenwood | 65/71 |
| 4,173,459 | 11/1979 | Aulich et al. | 65/13 X |
| 4,324,576 | 4/1982 | Matsuyama et al. | 65/26 |
| 4,417,910 | 11/1983 | Passaret | 65/3.12 |
| 4,419,115 | 12/1983 | Johnson et al. | 65/3.12 |
| 4,426,216 | 1/1984 | Satoh et al. | 65/18.1 |
| 4,574,063 | 4/1986 | Scherer | 264/60 |

FOREIGN PATENT DOCUMENTS

| | | |
|---|---|---|
| 0084438 | 3/1980 | European Pat. Off. . |
| 0032594 | 7/1981 | European Pat. Off. . |
| 0107943 | 5/1984 | European Pat. Off. . |
| 0147029 | 7/1985 | European Pat. Off. . |
| 2041913 | 9/1980 | United Kingdom . |
| 2103202 | 10/1980 | United Kingdom . |
| 2075003 | 11/1982 | United Kingdom . |
| 2140408 | 7/1984 | United Kingdom . |

Primary Examiner—Robert L. Lindsay
Attorney, Agent, or Firm—Blum Kaplan

[57] ABSTRACT

A sol-gel process for preparing dimensionally precise tubular silica glass articles wherein a solution having a specific gravity higher than the specific gravity of the sol solution is placed in a cylindrical container with the sol solution is provided. The container is rotated around its axis and the high specific gravity solution becomes aligned adjacent the inner wall of the cylindrical container due to the effect of centrifugal forces acting on the high specific gravity solution. The sol solution becomes aligned adjacent the inner surface of the high specific gravity solution. The tubular wet gel formed from the sol solution has a uniform thickness and a highly precise round cross-section. The dimensional precision of the wet gel is maintained by rotating the wet gel during drying in order to prevent warping.

29 Claims, 2 Drawing Sheets

METHOD OF PREPARING TUBULAR SILICA GLASS

CROSS-REFERENCE TO RELATED APPLICATIONS

This application is a continuation-in-part of copending U.S. patent application Ser. No. 782,333, filed Oct. 1, 1985 now U.S. Pat. No. 4,680,045, granted July 14, 1987.

BACKGROUND OF THE INVENTION

This invention relates to sol-gel processes for preparing tubular silica glass articles and more particularly, to a sol-gel process for preparing tubular silica glass articles having improved dimensional precision.

High purity silica glass is widely used as crucibles, boards and core tubes of diffusing furnaces used in the manufacture of semiconductor devices. In addition, high purity silica glass is useful for manufacturing glass instruments such as test tubes for chemical use, cells for optical measurement and substrates for thin film transistors. The demand for high purity glass is expected to expand significantly as a result of the large number of applications to which such glass has been and continues to be put.

Optical fibers formed primarily of silica glass are used as optical transmission media in the field of optical communication which includes information transmittance on a large scale. Preforms for these optical fibers are manufactured using silica glass tubes either as a starting material or to adjust the outer diameter of the preform. The silica glass tubes themselves must be of high quality and dimensionally precise so that high quality optical preforms can be made. The cost of manufacturing optical fibers is high due to the high cost of manufacturing the optical fiber preforms.

Prior art methods for manufacturing commercially available tubular silica glass (not necessarily for use in optical communication systems) include the following:
1. Washing and etching natural quartz crystal;
2. Forming silicon oxide from high purity silicon tetrachloride or silicon tetrahydride; and
3. Etching natural silica sand.

All of these prior art methods have disadvantages and it is extremely difficult to obtain tubular silica glass that meets the quality and dimensional precision required for use in optical communications systems using these methods. Furthermore, all of these methods require treatment of the glass at extremely high temperature and consequently, the cost of producing the glass is high. In fact, the third method is totally unsuitable for making optical fibers because of the low purity of the final product.

Recent attempts have been made to develop a sol-gel process that is useful for preparing silica glass tubes suitable for use as optical fibers. In general, sol-gel processes require use of an easily refined metal alkoxide as a starting material which permits high purity silica glass tubes to be obtained. In addition, transparent silica glass can be manufactured at temperatures lower than the transition point of the glass when sol-gel methods are used and consequently, the manufacturing cost is low.

An exemplary sol-gel process is disclosed in Japanese Laid-Open Patent Application No. 56-169121 of Hitachi. According to the process disclosed, a starting material consisting of silicon alkoxide, water, alcohol and a suitable catalyst is placed in a cylindrical container having a removable center bar. The material is gelled in the cylindrical container and the center bar is extracted when the material begins to shrink. Then the gel is dried and sintered to obtain a silica glass tube. Although this process is useful, it is difficult to manufacture large silica glass products without cracking and silica glass tubes of sufficient length cannot be obtained.

Another sol-gel method for manufacturing silica glass tubes using fumed silica as a starting material has been developed by Rabinovich. In the Rabinovich method the fumed silica is gelled and sintered and the resulting material is pulverized. The pulverized material is dispersed in a hydrosol solution which is then placed into a cylindrical container. A center bar is inserted into the sol solution in the container and the sol is gelled. After gelling the center bar is extracted to obtain a tubular gel. The tubular gel is dried and sintered and a glass tube having dimensions up to 1.7 cm inner diameter, 2.3 cm outer diameter and 25 cm length is obtained.

The Rabinovich process offers advantages over Hitachi because breaks and cracks occur less frequently during the formation and sintering steps and larger glass tubes can be obtained. However, the fact that two dispersion steps are required means that more impurities are likely to be introduced and the optical quality of the product may not be uniform.

The inventors have developed a sol-gel process that is suitable for preparing large silica glass articles. The process includes the steps of hydrolyzing a metal alkoxide to obtain a sol, adding fumed silica to the sol to obtain a sol solution, pouring the sol solution into a cylindrical container, gelling the sol solution while rotating the container around a tubular axis to obtain a tubular wet gel, drying the wet gel to obtain a dry gel and sintering the dry gel to obtain a tubular glass article. This process is disclosed in co-pending parent application, the specification of which is incorporated herein by reference as if fully set forth. However, it is desirable to provide even more uniformly dimensionally precise articles than can be prepared by the process of the parent application.

Accordingly, it is desirable to provide a sol-gel process for preparing dimensionally precise tubular silica glass articles which overcomes the disadvantages inherent in the prior art methods.

SUMMARY OF THE INVENTION

Generally speaking, in accordance with the invention, a sol-gel process for preparing a tubular silica glass article by gelling a sol solution in a rotating cylinder having a solution of a higher specific gravity than the sol solution is provided. The high specific gravity solution is a solution which is not miscible and does not react with the sol solution, such as a halogen-containing organic compound with the halogen atoms on the same or adjacent carbon atoms. The high specific gravity solution forms an inner cylindrical wall as the cylindrical container is rotated due to the effect of centrifugal forces and the sol solution is forced against this inner surface of the high specific gravity solution as the wet gel is formed. A tubular highly precise free surface is formed independent of the precision of the cylindrical container. The wet gel tube formed from the sol solution has a uniform thickness and a highly precise round cross-section.

In addition, the wet gel is rotated while being dried in order to prevent warping of the tube after gellation.

This can be accomplished by rotating the tubular gel on rotating rollers or by placing the tubular gel into a rotating cylindrical container. The rotation rate is preferably slow so as to prevent warping and maintain the dimensional precision of the tube.

Accordingly, it is an object of the invention to provide a process for preparing dimensionally precise tubular silica glass.

Another object of the invention is to provide a sol-gel process for preparing tubular silica glass wherein a sol solution having a higher specific gravity is provided in the cylindrical container with the sol solution during rotation.

A further object of the invention is to provide a sol-gel process for preparing tubular silica glass that includes the step of rotating the wet gel while drying.

Still other objects and advantages of the invention will in part be obvious and will in part be apparent from the specification.

The invention accordingly comprises the several steps and the relation of one or more of such steps with respect to each of the others, and the article possessing the features, properties and the relation of elements, which are exemplified in the following detailed disclosure, and the scope of the invention will be indicated in the claims.

DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
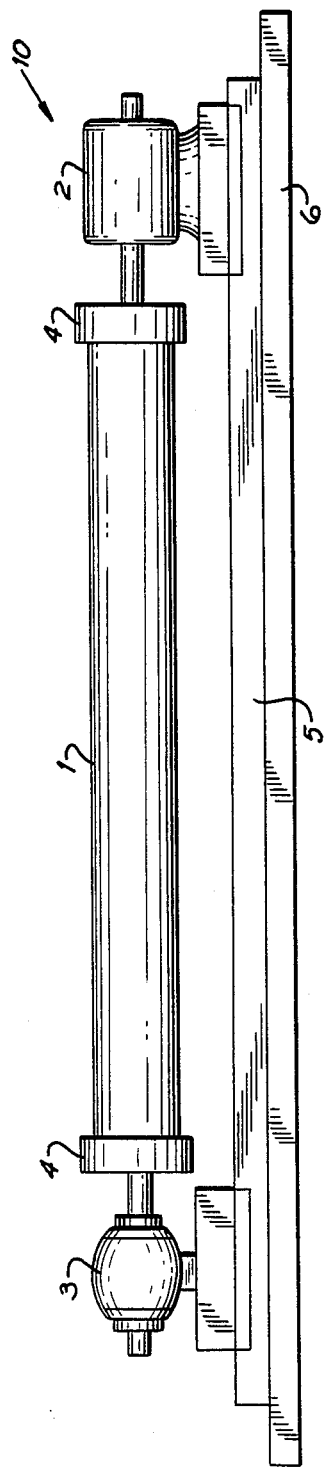
FIG. 1 is a side elevational view of a rotating apparatus used to form a tubular silica gel in accordance with the invention.

In the sol-gel process of the invention, a metal alkoxide is hydrolyzed to provide a sol, fumed silica is added to the sol to yield a sol solution, the sol solution is poured into a cylindrical container along with a solution having a higher specific gravity than the sol solution, the container is rotated about its axis to force the sol solution against the high specific gravity solution which forms against the container wall to gel the sol solution and form a tubular wet gel, the wet gel is dried while being rotated to yield a dry gel and the dry gel is sintered to provide a tubular glass article. The tubular glass article provided is dimensionally precise as a result of the use of the high specific gravity solution and the rotation of the wet gel during the drying step.

In order to hydrolyze silicon alkoxide to prepare a sol, water, hydrocholoric acid and, if necessary, a suitable solvent are added to silicon alkoxide. Fumed silica such as "white carbon" prepared by hydrolyzing silicon tetrachloride using an oxygen/hydrogen flame burner is added to the sol and the solution is stirred to form a sol solution. White carbon is marketed under the tradenames CABOSIL, AEROSIL a product of DeGussa, REOROSIL a product of Tokuyama Soda Kabushiki Kaisha, DD-SILICA a product of Dow Corning and ARC-SILICA a product of PPG. Fumed silica obtained by dry methods using sodium silicate can be used in place of the white carbon. Alternatively, when metal alkoxide is hydrolyzed with ammonia water, fine particles of silica are produced. These fine particles of silica can be collected and used in place of the white carbon.

The fumed silica is added to the sol in order to prevent cracking or breaking of the resulting dry gel in the sintering process. Cracking and breaking is reduced significantly because the fumed silica makes the resulting gel porous. In non-porous gels formed by prior art sol-gel methods, a significant amount of shrinkage occurs when the wet gel is dried to form a dry gel causing the gel to crack. Another disadvantage of prior art methods is the occurrence of foaming in the sintering step which also causes the gel to crack and break.

By adding fumed silica to the sol of hydrolyzed metal alkoxide, a porous dry gel results and cracking during the manufacturing process is prevented. The product has excellent optical properties since only a minimal amount of foam remains in the silica glass after sintering.

A suitable amount of fumed silica in the sol solution will prevent foaming during later processing steps. However, if the amount of fumed silica is too high, the production yield of the dry gel will be lowered. The optimum amount of fumed silica for providing a satisfactory production yield and preventing foaming is between about 0.2 and 5 parts fumed silica to about 1 part metal alkoxide.

Crystals such as crystbalite and tridimite are also sometimes produced in the silica glass after sintering and this is a form of devitrification. Such devitrification is more likely to occur when the fumed silica is not uniformly dispersed in the sol solution or when the sol includes a small amount of impurities.

Ultrasonic vibration or centrifugal separation can be applied to the sol solution in order to disperse the fumed silica uniformly. In addition, impurities can be removed by centrifugal separation and this is effective for preventing devitrification.

The resistance of the dry gel to shrinkage at the time of drying also depends significantly on the pH of the gel. The pH of a sol prepared by hydrolyzing metal alkoxide with an acid catalyst is generally between about 1 and 3. By raising the pH using a base such as ammonia water, the time required for gellation is reduced and the gel becomes structurally stronger so that shrinking during the drying step is inhibited. When the pH is between about 3 and 6 a strong unbreakable gel is obtained. It is therefore desirable to adjust the pH of the sol solution prior to the gelling step.

A base such as ammonia water, ammonia gas, a solution of ammonia and an inorganic base such as triethylamine, an aqueous solution of triethylamine, pyridine, an aqueous solution of pyridine, aniline or an aqueous solution of aniline can be used to adjust the pH of the sol solution. Bases that include metal alkali ions such as sodium hydroxide and potassium hydroxide are not suitable for adjusting the pH because the positive metal ions will remain in the final silica glass product. However, such bases can be used when a multi-component glass such as soda glass is to be manufactured.

One of the disadvantages of preparing a sol solution using commerically available fumed silica is that impurities such as aluminum and iron at concentrations between a few parts per million (ppm) and several hundred ppm are present in the silica. Consequently, the silica glass tubes obtained are not of extremely high purity.

In an alternate embodiment, a sol solution containing fumed silica prepared by hydrolyzing a metal alkoxide with a basic catalyst is used. This provides a silica glass tube of extremely high optical quality and purity since the sol solution can be refined easily.

A first hydrolyzed solution (Solution A) of silicon alkoxide hydrolyzed with an acid catalyst and a second hydrolyzed solution (Solution B) of silicon alkoxide hydrolyzed with a basic catalyst are prepared. The two hydrolyzed solutions include $SiO_2$ particles of completely different sizes depending on the catalyst. When a basic catalyst is used the silica particles are larger than those obtained when an acid catalyst is used. Large silica particles are provided by adjusting the amount of catalyst, the amount of silicon alkoxide with respect to the amount of solvent, the amount of water, the temperature and the like. In order to form a large dry gel and then a large silica glass article, it is necessary for the dry gel to contain large pores. The relatively large particles of silica in the base catalyzed solution provide the pores and the small particles in the acid catalyzed solution enhance the attraction between the large silica particles in the base catalyzed solution.

The particle diameter of the silica in Solution B should be at least about $0.1\mu$ and less than or equal to about $1.0\mu$. If the particle diameter is too large a uniform sol is not formed and the silica will precipitate. Furthermore, since the sol is gelled while being rotated, the effect of centrifugal force must be taken into account in determining the appropriate silica particle size.

Depending on the synthesis conditions, Solution B generally includes a low concentration of silica. This is due to the fact that it is impossible to provide silica particles of uniform particle diameter unless a large amount of solvent compared to the amount of silicon alkoxide is present. In order to manufacture a dry gel with good yield, the silica concentration of the sol solution is preferably high. However, when the silica concentration is too high, dispersing properties are deteriorated and the product is degraded. It has been determined that suitable silica concentration of Solution B is between about 0.15 and 1.0 g/cc.

The properties of the dry gel largely depend on the mixing ratio of Solutions A and B. If too much Solution A is used, the pores of the dry gel are smaller and breaks and foaming of the gel are more likely to occur. If the amount of Solution B is too large, the pores are larger, the strength of the dry gel is decreased and sintering must be performed at higher temperatures.

In order to provide a large and high quality silica glass, the mixing ratio of Solutions A and B M(A)/M(B) is between about 0.2 and 3 wherein M(A) and M(B) are the mol amounts of silica included in Solutions A and B, respectively. When a mixture of Solutions A and B is used as the starting sol solution, it is not necessary to provide a specific dispersing process.

The gellation time of the sol solution is largely dependent on the pH. When the pH of the sol is around 6, the gellation time is shortest and the sol is gelled instantly. When the pH is 3 or less, the sol phase is stably maintained for an extended period of time. When Solutions A and B are mixed directly, the acid and base are neutralized and the pH of the mixture sol is close to 6. As a result, the sol is gelled instantly and cannot be handled conveniently.

In view of this, it is necessary to adjust the pH of each of Solutions A and B prior to mixing so that the pH of the mixture sol is a selected value. Three methods are generally used to adjust the pH of Solutions A and B;
1. the pH of Solution A is lowered;
2. the pH of Solution B is lowered; and
3. the pH of both of Solutions A and B are lowered.

The qualities of the resulting sol and the final product are not affected by the method of pH adjustment used. It is also possible to adjust the pH of the mixture by the addition of ammonia water, hydrochloric acid and the like.

In order to prepare silica glass tubes the sol solution is placed into a cylindrical container and gelled while rotating the container around a tubular axis, preferably a horizontal tubular axis. The outer surface of the tubular gel has the shape of the inner surface of the cylindrical container, which is directly transferred to the tubular gel. Therefore, in order to increase the dimensional precision and smoothness of the outer surface of the tubular gel, it is necessary to increase the precision and smoothness of the inner surface of the cylindrical container. Furthermore, if the axis of the cylindrical container does not coincide with the axis of the rotating machine, the inner and outer circumferences of the tubular gel will not be eccentric and the thickness of the gel will not be uniform.

These disadvantages are overcome in accordance with the invention wherein a solution having a specific gravity higher than that of the sol solution is placed into the cylindrical container along with the sol solution. The solution having a higher specific gravity is formed adjacent the inner wall of the cylindrical container while the container is rotated around the tubular axis. As long as the axis of rotation does not shift, the solution having a higher specific gravity forms a tubular highly precise free surface around the rotation axis regardless of the precision of the finish of the inner surface of the wall of the cylindrical container. The sol solution contacts the free surface of the high specific gravity solution and forms a tube of concentric layers of sol solution and high specific gravity solution. As a result of the continued rotation of the tube the sol solution is gelled and a tubular wet gel having mirror finishes on both the inner and outer surfaces, a uniform thickness, a round cross-section and high dimensional precision is formed.

FIG. 1 shows a rotating apparatus 10 used to gel the sol solution while it is being rotated in a cylinder 1 in accordance with the invention. Machine 10 includes cylinder 1 mounted for rotation on a guide rail 5 mounted on a base 6. Cylinder 1 is held by a pair of fixing members 4. One fixing member 4 is coupled to a motor 2 mounted on guide rail 5 and the other fixing member 4 is supported by a shaft receiver 3 mounted on guide rail 5.

Figure 2:
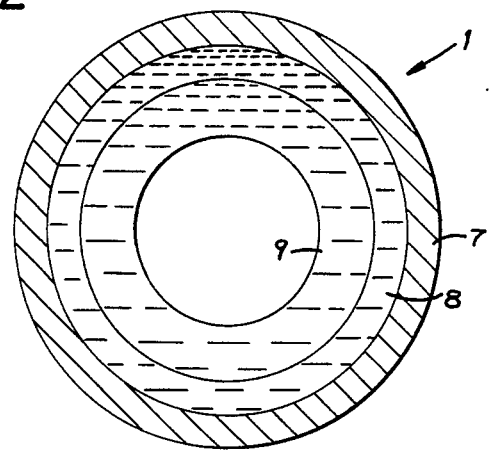
FIG. 2 is a cross-sectional view of a sol solution and a high specific gravity solution in a cylindrical container while being rotated in the apparatus of FIG. 1.

A sol solution and a high specific gravity solution are placed into cylindrical container 1 and the container is rotated by motor 2. A cross-sectional view of container 1 and its contents during rotation are shown in FIG. 2. Container 1 includes a cylinder wall 7 and a cylindrical shaped high specific gravity solution 8 and a sol solution 9 in concentric circles. The dimensional precision of the outer surface of sol solution 9 is not dependent on the dimensional precision of the inner surface of cylinder wall 7.

By gelling and hardening the sol solution inside the high specific gravity solution, a tubular gel of high dimensional precision forms. The high specific gravity solution must not dissolve the sol solution, be dissolved by the sol solution or have a large solubility with the sol solution. In addition, material that reacts with the dispersion medium or extracts the dispersion medium of the sol solution is not desirable.

Suitable solutions having a higher specific gravity than the sol solution include halogen compounds in which multiple halogen atoms are on the same or adjacent carbon atoms. Such compounds include, but are not limited to, FLOURINERT, a product of Sumitomo 3M having the structure $(CF_2CF_2CF_2CF_2O)_n$, tetrachlorodifluoroethane ($CCl_2F$—$CCl_2F$), trichlorotrifluoroethane ($CCl_2F$—$CClF_2$), carbon tetrachloride ($CCl_4$), tetrachloroethylene ($CCl_2$—$CCl_2$), bromoform ($CHBr_3$), dibromoethane ($BrCH_2CH_2Br$) and diiode methane ($CH_2I_2$). Mixtures of two or more of these solutions can also be used. Additionally, mercury, which is a metal that is in a liquid phase a room temperature can also be used.

The fumed silica dispersed in the hydrolyzed solution of silicon alkoxide precipitates as a result of centrifugal force when the gel is rotated. This causes the composition of the sol and the resulting gel to become non-uniform causing the gel to crack during the drying and sintering steps and the final silica glass product to have inferior optical properties. In order to avoid this problem, the rotation rate and rotation period of gellation must be adequately controlled so as to prevent precipitation of fumed silica. The rotation rate is the primary factor that can be controlled since the rotation period is determined by the time required for gellation to occur, assuming that the size of the silica glass tube is fixed.

The centrifugal force applied to the fumed silica in the sol solution in the cylindrical rotation container is a minimum of 1G (9.8 m/s$^2$). The upper limit of the centrifugal force cannot be determined because it depends on the particle diameter of the fumed silica, the distance between the silica particles and the center axis of the cylindrical container. For example, when the fumed silica has a particle diameter of about 500 Å and the cylindrical container has an inner diameter of 5 cm, the fumed silica particles at the outermost circumference of the container forms visible precipitates when a centrifugal force of 500 G is applied for a period greater than about 30 minutes. Even when fumed silica is not included in the sol solution and a centrifugal force of at 1000 G is applied, cracking occurs during gellation. Accordingly, a suitable rotation rate should be selected so that the centrifugal force produced by the rotation and applied to the fumed silica in the sol solution is at least 1000 G.

The container and drying conditions must be selected for optimization of production yield when a large dry gel is to be formed. The container is preferably a hydrophobic material. Suitable materials include organic polymers such as polypropylene, polyethylene fluoride (Teflon), polyvinyl chloride, polyethylene and polystyrene. Containers made of an inorganic material such as glass having an organic polymer coated on the inner surface can also be used.

Immediately after gellation the tubular wet gel is soft and its shape changes easily. If the rotation is stopped, the shape of the tubular wet gel will change due to the effect of gravity and the roundness of the tubular gel deteriorates before the gel is dried. In addition, the distortion of the tubular wet gel results in breaks and cracks during the drying and sintering steps. These problems occur even when a solution having a high specific gravity is used as the mold wall. The buoyancy of the high specific gravity solution urges the tubular wet gel to the center of the cylindrical container and distortion results.

Immediately after gellation the tubular wet gel is soft but it gradually shrinks and hardens. After a period of time the wet gel becomes hard enough to resist transformation due to gravity or the buoyancy of the high specific gravity solution and rotation during this period will provide a gel of high dimensional precision in accordance with the invention. This period of time is between about 30 minutes and 30 hours.

The rotation rate during the drying period can be low since it is only necessary to prevent gravity or buoyancy from affecting the tubular gel in any one direction for an extended period of time. A minimum effective rotation rate is about 0.1 rotations per minute. it is possible to use a rotation rate as high as that used during gellation, but use of a such a rotation rate is not cost effective.

After rotation is stopped, the space between the container and the tubular gel is filled with the high specific gravity solution. As a result, external shock to the tubular gel is decreased and production yield is increased. Furthermore, by filling the space with a high specific gravity solution, splinters and the like from the cylindrical container are prevented from becoming embedded in the tubular gel.

If the specific gravity of the high specific gravity solution is close to that of the sol solution, transformation of the tubular gel due to the buoyancy of the high specific gravity solution can be prevented. Furthermore, the high specific gravity solution preferably includes components of the dispersion medium of the sol so that the tubular gel shrinks smoothly due to evaporation of the dispersion medium of the sol.

The tubular wet gel is dried in the container with a lid having a specific opening ratio. If the gel is dried non-uniformly or if the drying speed varies, the tubular gel is prone to warping or breaking. This is more noticeable when the tubular gel is long. The uniformity of drying can be assured by reducing the container openings and drying the gel slowly. However, this increases the manufacturing time and cost.

Figure 3:
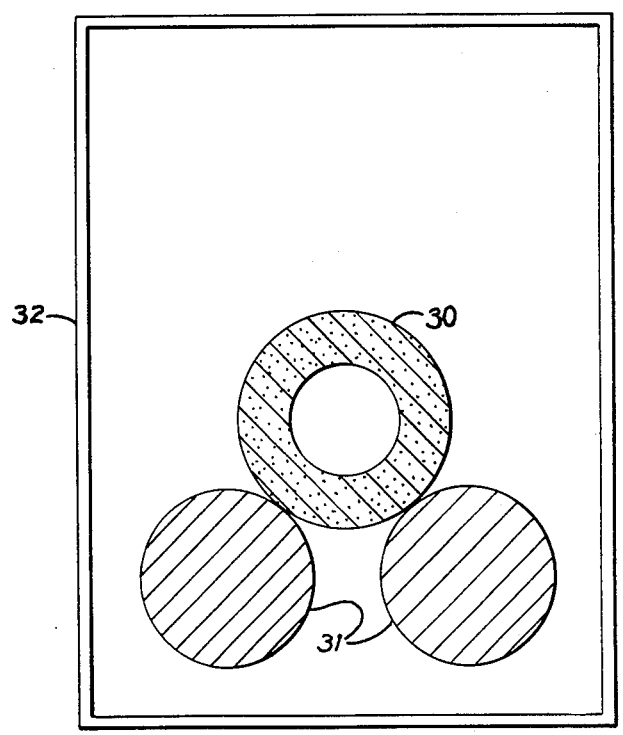
FIG. 3 is a cross-sectional view of a drying container used to dry a tubular wet gel formed in the apparatus of FIG. 1 while rotating the gel.

In accordance with the invention, the tubular wet gel is dried while being rotated around the axis of the tube. A system for drying the gel while it is being rotated is shown in FIG. 3 wherein a tubular gel 30 is rotated on a pair of rollers 31 mounted for rotation in a sealed container 32. By drying the wet gel while rotating the gel, any non-uniformity caused in the drying step is reduced substantially and a straight tubular dry gel is obtained. Furthermore, since the non-uniformity caused by drying is reduced, the drying speed and productivity are increased.

Tubular gel 30 can be rotated on rotating rollers 31 of the type shown in FIG. 3 or can be placed in a rotating cylindrical container. The rotation rate can be small since it is sufficient if warping is prevented. If the rotation rate is too large, the tubular gel is likely to break due to the effect of vibration and the like. A suitable maximum rotation rate is about 100 rotations per minute. In contrast, if the rotation rate is too small, the tubular gel will warp. A suitable minimum rotation rate is greater than or equal to about 1 rotation a day.

Optimum drying conditions depend on the evaporation rate of the solvent such as water or alcohol included in the gel, the opening ratio of the lid, i.e. the ratio of the sum of the area of the openings on the surface of the lid to the total surface area of the lid, the drying temperature and the humidity. The rate of evaporation of the solvent from the gel is slow and the gel is unlikely to crack when the opening ratio of the lid is reduced. However, the increased length of time required to dry the gel results in increased manufacturing costs. It is desirable to optimize the opening ratio to increase the production yield while reducing the time required for evaporation.

The likelihood of cracking the gel also depends on the drying temperature. Stronger gel structures and high production yields result from higher temperatures. However, it is difficult to control the drying temperature at temperatures higher than the boiling point of the solvent. Accordingly, the upper limit of suitable drying temperatures is about 120° C. Experiments have demonstrated that the optimum drying conditions are a drying temperature between about room temperature (20° C.) and 120° C. and a lid opening ratio equal to or less than about 50% and preferably equal to or less than about 10%.

The wet gel is heated to a predetermined drying temperature to obtain a dry gel. The heating rate must be optimized between a rate as slow as possible for increasing the yield and a rate as fast as possible for reducing the manufacturing time. It has been determined that suitable heating rates are equal to or less than about 120° C. per hour.

The dry gel is then sintered in order to:
1. remove absorbed water;
2. remove carbon; and
3. make the gel non-porous.

The first step of removing absorbed water has the greatest effect on the production yield. The dry gel includes a large amount of physically absorbed water which can be removed by heat treatment at about 400° C. However, if the temperature is raised too quickly, the gel is likely to break. On the other hand, if the heating rate is too slow, the yield is enhanced at the expense of increased manufacturing cost. The upper limit of a suitable heating rate for removing absorbed water is about 400° C. per hour. It is desirable to perform the step of maintaining the gel at a temperature between room temperature (20° C.) and 400° C. for at least one hour at least once during the heating step.

The second step of removing organic components or decomposed matter remaining in the gel is accomplished by heat treatment at a temperature between about 400° and 1100° C. The heating rate has an effect on the yield although not as serious an effect as is observed in the first sintering step. Suitable heating rates are between about 5° and 400° C. per hour. Furthermore, it is desirable to perform the step of maintaining the gel at a temperature within the final temperature range for at least 3 hours at least once during the heating step.

When the pH of the sol solution has been adjusted using a base, the hydrochloride of the base remains in the dry gel. The residual hydrochloride can be decomposed together with the organic components during the step of removing carbon rendering this sintering step particularly efficient.

The third step of making the dry gel non-porous is performed at a temperature between about 1000° and 1400° C. although suitable temperatures can vary depending on the amount of fumed silica dispersed in the sol solution. Suitable heating rates for elevating the temperature from the final temperature used in the step of removing carbon to the temperature for closing the pores in the gel is between about 5° and 400° C. per hour. By maintaining the gel at a predetermined temperature between about 1000° and 1400° C. for a predetermined period of time, transparent silica glass having an infrared absorption spectrum, Vickers hardness and specific gravity nearly the same as that observed in prior art silica glass formed by non-sol-gel methods can be obtained.

If the gel is maintained at a temperature higher than the final temperature for making the gel non-porous for an extended period of time after the gel becomes non-porous, foams are produced in the gel due to water contained in the silica glass. The lower the water content, the less foaming. The water content of the silica glass is determined by the amount of fumed silica in the starting sol solution. The less silica in the sol solution, the lower the water content of the silica glass produced.

As described, a silica glass article can be obtained by sintering a dry gel in atmosphere. However, if the glass is heated to a temperature greater than or equal to about 1400° C., foaming occurs due to air sealed in the closed pores. In order to prevent foaming, it is effective to displace the air in the pores with helium or to evacuate the pores before sintering. Either of these steps will reduce the foaming remarkably.

The most preferable temperature for displacing the air in the pores with helium or evacuating the pores is between about 500° and 1150° C. and is lower than the temperature at which closed pores are produced. The temperature largely depends on the composition of the sol but at temperatures less than about 500° C., oxygen is necessary to remove organic matter and the like by oxidation. At temperatures greater than about 1150° C., closed pores are produced in the gel. When open pores exist in the gel and the atmosphere is changed from vacuum or helium to another atmosphere such as air, for example, the air or other gas enters the open pores. When the gel is heated, the pores foam as they are closed. Therefore, after the atmosphere is substituted with helium or evacuated, it is necessary to continue sintering until the open pores at the surface of the gel disappear.

Prior to changing the atmosphere to helium or creating a vacuum, an inert gas atmosphere including oxygen should be provided. By providing an oxygen atmosphere organic matter can be removed by oxidation. If it is desirable to remove hydroxyl (OH) groups in the silica glass, an OH group removing agent can be used. The OH group removing agent is generally chlorine gas or any compound that decomposes to produce chlorine-containing byproducts such as SOCl and HCl. Compounds that decompose to form fluorine-containing byproducts such as $SF_6$, $CF_4$, $C_2F_6$ and $C_3F_8$ can also be used.

The OH group is removed after the carbon is removed at a temperature between about 700° and 1100° C. The heating rate from the step of removing carbon to the OH group removing step is between about 30° and 300° C. per hour. If the temperature in the OH group removing step is less than about 700° C., the removing agent is not highly reactive and few OH groups are removed. On the other hand, if the temperature is too high, the OH group removing agent enters the silica glass in an excessive amount and causes cracks. Additionally, the OH group removing agent becomes sealed in the closed pores and causes foaming. It is for this reason that the upper limit of the temperature of the OH group removing step is 1150° C. and more preferably 1000° C.

When the heating rate from the step of removing carbon to the step of removing OH groups is too low, the manufacturing cost increases. When the rate is too high, cracking occurs in the gel. Suitable heating rates are between about 30° and 300° C. per hour and more preferably between about 30° and 100° C. per hour.

The OH group removing agent can be used alone or diluted with a gas such as helium, oxygen, nitrogen, argon and the like. If the concentration of the OH group removing agent is less than about 1% by volume, the effect of the agent is decreased significantly. The concentration of the OH group removing agent is preferably between about 1 and 50% and more preferably between about 5 and 50% by volume. When the OH group removing agent is diluted, it is desirable to remove as much water as possible from the gas used to dilute the agent. It is also desirable to use a dry gas after the OH group has been removed.

Prior to removing the OH group, the gel is maintained at a temperature between about 700° and 1150° C. for at least 30 minutes in order to accelerate the dehydration condensation reaction. By carrying out this step, the amount of OH group is reduced significantly and the OH group removing agent is prevented from entering the pores in the silica glass. As a result, foaming and cracking is avoided.

After the OH group is removed, the dry gel is sintered in vacuum or under helium atmosphere until the small pores at the surface of the gel disappear. At this point, it is possible that an excessive amount of the OH group removing agent will be present in the silica glass. If this is the case, the OH group in the glass can decompose or foam when the silica glass is heated to a temperature close to its melting point. Accordingly, it is desirable to remove the OH group removing agent in an oxygen atmosphere or in an inert gas including oxygen. If the concentration of oxygen is less than about 1% per volume, the OH group removing agent cannot be removed. Suitable concentrations of oxygen are at least 1% and more preferably at least 10% by volume.

The OH group removing agent is removed at a temperature of between about 900° and 1150° C. and more preferably between about 1000° and 1100° C. If the temperature is less than about 900° C., the reactivity of the oxygen is low and the OH group removing agent is not removed sufficiently. If the temperature is higher than about 1150° C., the oxygen is sealed in the closed pores in the gel and foams.

After the OH group removing agent is removed, the dry gel is sintered in vacuum or under helium atmosphere until the small pores at the surface of the gel disappear. Accordingly, a silica glass tube having a low OH group concentration and in which foaming does not occur even at temperatures higher than the melting point is provided.

The invention will be further described with reference to the following examples. These examples are presented for purposes of illustration only and are not intended to be construed in a limiting sense.

EXAMPLE 1

800 ml of refined commercially available silicon ethoxide, 640 ml of 0.02 normal hydrochloric acid and 264 g of fumed silica (AEROSIL OX50) were mixed and stirred violently. The solution was ultrasonically vibrated, centrifugally separated and filtered to yield a uniform sol. The pH of the sol solution was adjusted to 5.0 by the addition of 0.1 normal ammonia water and the resulting sol solution was filtered.

1400 ml of the sol solution and 160 ml of FLORINATE having a specific gravity of 1.98 which is higher than the specific gravity of the sol solution were placed in a stainless steel cylindrical container having dimensions of 5.2 cm inner diameter and a length of 100 cm. FLOURINERT has the structural formula $-(CF_2CF_2CF_2CF_2)_{\overline{n}}$ and is a product of Sumitomo 3M. Both ends of the cylindrical container were sealed with rubber stoppers and the container was set on a rotating apparatus of the type shown in FIG. 1.

Container 1 was rotated at a rate of 100 rpm. A cross-section of the inside of container 1 during rotation is shown in FIG. 2. A cylindrical portion of FLOURINERT solution 8 forms between sol solution 9 and cylinder wall 7. The container was rotated for 30 minutes to assure that the sol solution had gelled to form a wet gel. The container was then removed from the rotating machine and maintained still overnight. When a high specific gravity material such as FLOURINERT is used, the cylindrical container can be constructed of a metal such as aluminum or a strong resin such as an epoxy resin containing glass fiber. Alternatively, the inside of the cylindrical container can be coated with a resin such as epoxy, polyester or fluorine.

The wet gel was removed from container 1 and placed into a vinyl chloride box container having dimensions of 50 cm width, 120 cm length and 20 cm height. The lid of the container had openings amounting to 1% of the total surface area of the lid. The wet gel was heated from 20° to 60° C. at a hearing rate of 2° C. per hour and dried at 60° C. for 10 days. A dry gel having dimensions of 3.5 cm outer diameter, 1.8 cm inner diameter and 70 cm length that did not break at room temperature was removed. 20 dry gels were prepared under these conditions. 4 of the gels broke and 16 dry gels were recovered. Yield: 80%.

The 16 complete dry gels were placed in a quartz sintering oven and heated to 300° C. at a rate of 60° C. per hour while $O_2$ gas flowed through the oven at a rate of 1 liter/minute. The gels were maintained at 300° C. for 1 hour in order to removed absorbed water. The gels were heated further to 700° C. at a heating rate of 60° C. per hour and maintained at 700° C. for 1 hour to remove carbon and ammomium chloride. The gas in the oven was replaced by helium flowing at a rate of 1 liter/minute and chlorine at a rate of 0.1 liter/minute and the gel was heated to 1000° C. at a heating rate of 30° C. per hour in order to remove OH groups. The gel was maintained at 1000° C. for 1 hour while $O_2$ gas flowed through the oven at a rate of 1 liter/minute. The gel was heated further to 1100° C. at a heating rate of 60° C. per hour in order to remove chlorine. While He gas flowed through the oven at a rate of 1 liter/minute, the gel was heated to 1250° C. at a heating rate of 60° C. per hour and maintained at 1250° C. for 1 hour to close the pores in the gel.

The gel was placed into the box oven a second time and heated from 1250° C. to 1400° C. at a heating rate of 60° C. per hour. The gel was maintained at 1400° C. for 1 hour to yield transparent silica glass tubes having dimensions of 2.5 cm outer diameter, 1.3 cm inner diameter and 50 cm length. None of the dry gels broke in the sintering process and 16 silica glass tubes were recovered. Yield: 100%.

The silica glass tubes had mirror smooth finishes on both the inner and outer surfaces and a roundness of 18μ. The coeccentricity of the inner and outer circumferences was 5μ.

The maximum amount of OH groups included in the finished silica glass tubes was 1 ppm. Even when the glass was heated to 2000° C. using a ring heater and melted, no foaming was observed. The silica glass tubes were of excellent quality.

In this example, FLOURINERT was used as the high specific gravity solution. Other examples of suitable high specific gravity solutions include dibromoethane ($BrCH_2CH_2Br$) having a specific gravity of 2.18, tetrachlorodifluoroethane having a specific gravity of 1.63, trichlorotrifluoroethane having a specific gravity of 1.57, a mixture solution of tetrachlorodifluoroethane and trichlorotrifluoroethane, carbon tetrachloride having a specific gravity of 1.63, bromoform having a specific gravity of 2.90 and diiodemethane having a specific gravity of 3.33. However, any material having a higher specific gravity than the sol and which does not dissolve the sol or dissolve in the sol is suitable for use as the high specific gravity solution in the process of the invention. Any of these solutions are as effective as FLOURINERT for yielding a silica glass tube having a finish on the outer surface.

EXAMPLE 2

A sol solution having a pH of 5.0 was prepared as described in Example 1. 1400 ml of the resulting sol solution was put into a polypropylene cylindrical container having dimensions of 5 cm inner diameter and 100 cm length. Both ends of the container were sealed with rubber stoppers. The container was set on rotating apparatus 10 of the type shown in FIG. 1 and rotated at a rate of 1000 rpm. A sample used as a control was gelled after 30 minutes, but rotation was continued for varying periods and the results are shown in Table 1.

TABLE 1

| Additional Rotation Period After Gellation | Yield (%) | Roundness (μ) |
| --- | --- | --- |
| 10 minutes | 80 | 32 |
| 30 minutes | 90 | 13 |
| 5 hours | 95 | 7.9 |
| 15 hours | 95 | 4.0 |
| 30 hours | 90 | 3.7 |
| 45 hours | 80 | 3.6 |

The containers were removed from the rotating machine and maintained still overnight.

Each wet gel was placed into a vinyl chloride box container having dimensions of 50 cm width, 120 cm length and 20 cm height. The lid has openings amounting to 1% of the total surface area of the lid. The wet gel was heated from 20° to 60° C. at a heating rate of 2° C. per hour and dried at 60° C. for 10 days. Dry gels having dimensions of 3.5 cm outer diameter, 1.8 cm inner diameter and 70 cm length that did not break at room temperature were recovered. 20 dry gels were prepared under these conditions with no breakage. Yield: 100%.

The dry gels were placed in a sintering oven with $O_2$ gas flowing at a rate of 0.4 liter/minute and $N_2$ gas flowing at a rate of 1.6 liter/minute. The gel was heated to 200° C. at a heating rate of 60° C. per hour and maintained at 200° C. for 3 hours. The gel was then heated to 300° C. at a heating rate of 60° C. per hour and maintained at 300° C. for 5 hours in order to remove absorbed water. The gel was heated further to 700° C. at a heating rate of 60° C. per hour and maintained at 700° C. for 20 hours in order to remove carbon and ammonium chloride. The gas flowing through the oven was changed to $O_2$ gas flowing at a rate of 1.6 liter/minute and $Cl_2$ gas at a rate of 0.4 liter/minute and the gel was heated to 1000° C. at a heating rate of 100° C. per hour to remove OH groups. The gel was maintained at 1000° C. for 10 hours while He gas flowed through the oven at a rate of 1 liter/minute and was then heated to 1300° C. at a heating rate of 60° C. per hour. The gel was maintained at 1300° C. for 2 hours to close the pores in the gel. The finished transparent silica glass tubes had dimensions of 2.5 cm outer diameter, 1.3 cm inner diameter and 50 cm length. None of the 20 dry gels broke during the sintering process. Yield: 100%.

The relationship between the rotation period after gellation, the yield of the dry gel and the roundess of the silica glass tubes prepared is shown in Table 1. If rotation is continued for more than about 30 minutes after gellation, yield and roundness improve. On the other hand, when rotation was continued for more than about 30 hours, the yield decreased. Accordingly, it is desirable to continue rotation for a period between about 30 minutes and 30 hours after the sol solution is gelled.

The maximum amount of OH groups included in the silica glass was 1 ppm. Even when the glass was heated to 2000° C. using a ring heater and melted, no foaming was observed.

EXAMPLE 3

Wet gels were prepared by the method described in Example 2. Ten minutes after the sol solution was gelled, the rotation rate was changed to the rates shown in Table 2 and rotation was continued for 15 hours.

TABLE 2

| Rotation Rate (rpm) | Yield (%) | Roundness (μ) |
| --- | --- | --- |
| 0.1 | 85 | 13 |
| 10 | 90 | 8.2 |
| 300 | 95 | 6.5 |
| 1000 | 95 | 4.0 |
| 2000 | 90 | 3.9 |
| 4500 | 45 | 3.8 |

As can be seen in Table 2, when the rotation rate was as low as 0.1 rpm, rotation after gellation was effective for increasing the roundness and, within limits, the higher the rotation rate, the higher the yield. However, when the rotation rate was too high, the yield decreased.

EXAMPLE 4

A sol solution having a pH of 5.0 was prepared as described in Example 1. 1400 ml of the sol solution was placed in a polyethylene fluoride (Teflon) cylindrical container having dimensions of 5 cm inner diameter and 100 cm length. Both ends of the container were sealed with rubber stoppers. The container was set on rotating apparatus 10 of the type shown in FIG. 1 and rotated at a rate of 1000 rpm. After 30 minutes rotation it was determined that gellation had occurred and the container was removed from the rotating machine. A mixture solution of equal parts of water and ethanol by volume were poured into the container with the gel and the container was maintained still overnight.

The wet gel was placed into a vinyl chloride box container having dimensions of 50 cm width, 120 cm length and 20 cm height. The container lid had openings amounting to 1% of the total surface area of the lid. The wet gel was heated from 20° to 60° C. at a heating rate of 2° C. per hour and dried at 60° C. for 10 days. The resulting dry gel had dimensions of 3.5 cm outer diameter, 1.8 cm inner diameter and 70 cm length and did not break at room temperature. 20 gels were prepared under these conditions. 1 of the gels broke and 19 dry gels were obtained. Yield: 95%.

The 19 complete dry gels were placed in a sintering oven and heated to 300° C. at a heating rate of 60° C. per hour while a mixture of $O_2$ gas and $N_2$ gas flowed through the oven. The rate of flow of each gas was 0.5 liter/minute. The gel was maintained at 300° C. for 1 hour in order to remove absorbed water. The gel was then heated to 1000° C. at a heating rate of 60° C. per hour and maintained at 1000° C. for 1 hour in order to remove carbon and ammonium chloride. The gas was substituted with helium flowing at a rate of 1 liter/minute and the gel was heated to 1250° C. at a heating rate of 60° C. per hour. The gel was maintained at 1250° C. for 1 hour in order to close the pores in the gel. The resulting transparent silica glass tubes had an outside diameter of 2.5 cm, inner diameter of 1.3 cm and were 30 cm in length. None of the dry gels broke in the sintering process and 10 silica glass tubes were obtained with a yield of 100%.

The outer and inner surfaces of the silica glass tubes were smooth and no foreign matter was included. Furthermore, even when the glass was heated to about 2000° C. and melted using a ring heater, no foaming was observed.

EXAMPLE 5

A sol solution having a pH of 5.0 was prepared as described in Example 1. 1400 ml of the sol solution was placed in a polyethylene fluoride cylindrical container having dimensions of 5 cm inner diameter and 100 cm length. Both ends of the container were sealed with rubber stoppers. The container was placed on rotating apparatus 10 of the type shown in FIG. 1 and rotated at a rate of 1000 rpm. The sol solution gelled after 30 minutes and the container was removed from rotating apparatus 10 and held still overnight.

The tubular wet gel was placed in drying container 32 of the type shown in cross-section in FIG. 3. Tubular wet gel 30 was placed on cooperating rollers 31. The upper surface of sealed container 32 has openings amounting to a predetermined percent of the total upper surface area. The sealed container used in this Example had lid openings amounting to 1% of the surface area of the lid. The wet gel was heated from 20°0 to 60° C. at a heating rate of 2° C. per hour and dried at 60° C. for 10 days while being rotated. The resulting dry gel had a 3.5 cm outer diameter, 1.8 cm inner diameter and 70 cm length that did not break at room temperature.

The dry gel was placed in a sintering oven and heated to 300° C. at a heating rate of 60° C. per hour while $O_2$ gas flowed through the oven at a rate of 1 liter/minute. The gel was maintained at 300° C. for 5 hours in order to remove absorbed water. The gel was then heated to 500° C. at a heating rate of 60° C. per hour and maintained at 500° C. for 20 hours in order to remove carbon and ammonium chloride. The pressure in the container was reduced to 1 Torr using a rotary pump. The gel was then heated to 1250° C. at a heating rate of 60° C. per hour and maintained at 1250° C. for 1 hour in order to close the pores in the gel. The finished transparent silica glass tubes had 2.5 cm outer diameter, 1.3 cm inner diameter and 50 cm length. None of the dry gels broke in the sintering process and a yield of 100% was achieved.

The relationship between the rotation rate during drying, the yield and the straightness of the resulting silica glass tubes is shown in Table 3.

TABLE 3

| Rotation Rate | Yield (%) | Straightness (mm) |
|---|---|---|
| 1 rotation/day | 90 | 1.0 |
| 1 rotation/hour | 100 | 0.5 |
| 1 rotation/minute | 100 | 0.2 |
| 100 rotation/minute | 90 | 0.1 |
| 500 rotation/minute | 55 | 0.1 |
| no rotation | 80 | 5.5 |

As can be seen, yield and straightness are both improved by rotating the wet gel while it is being dried. Even a rotation rate of 1 rotation per day is effective. The higher the rotation rate, the straighter the glass tube. However, the yield is lowered if the rotation rate is too high. In an especially preferred embodiment, the rotation rate is about 100 rpm.

Even when the glass tubes were heated to about 2000° C. using a ring heater, no foaming was observed.

EXAMPLE 6

A sol solution was prepared as described in Example 1. The sol solution was gelled using the rotation method of Example 5 and maintained still overnight.

The rubber stoppers of the cylindrical container were removed and the tubular wet gel in the cylindrical container was placed in a drying container of the type shown in FIG. 3. The cylindrical container containing the wet gel was rotated at a rate of 1 rpm and dried as described in Example 5. The yield in both the drying process and sintering process was 100% and the silica glass tubes obtained had a straightness of 0.2 mm.

EXAMPLE 7

A sol solution having a pH of 5.0 was prepared as described in Example 1. 1400 ml of the sol solution and 160 ml of dibromoethane having the structural formula $BrCH_2CH_2Br$ and a specific gravity of 2.18 which is higher than the specific gravity than that of the sol solution were placed in an aluminum cylindrical container having dimensions of 5.2 cm inner diameter and 100 cm length. Both ends of the container were sealed with rubber stoppers. The container was set on a rotating machine of the type shown in FIG. 1 and rotated at a rate of 1000 rpm. The sol had gelled after being rotated for 30 minutes. Rotation was then continued for an additional 20 hours at a rotation rate of 1000 rpm. The cylindrical container was removed from the rotating machine and the dibromoethane was extracted. The container was then filled with a solution of 1 part water to 2 parts ethanol by volume and the container was maintained still overnight.

The wet gel was placed in a drying container of the type shown in FIG. 3 having openings amounting to 1% of the upper surface area. The gel was heated from 20° to 60° C. at a heating rate of 2° C. per hour while rotating at a rate of 1 rpm. The gel was dried at 60° C. for 10 days to yield a dry gel having dimensions of 3.5 cm outer diameter, 1.8 cm inner diameter and 70 cm that did not break at room temperature. 20 dry gels were made under these conditions and none of the gels broke. Yield: 100%.

The 20 complete dry gels were placed in a sintering oven and heated to 200° C. at a heating rate of 60° C. per hour while $O_2$ gas flowed through the oven at a rate of 1 liter/minute. The gels were maintained at 200° C. for 3 hours, then heated to 300° C. at a heating rate of 60° C. per hour and maintained at 300° C. for 5 hours in order to remove absorbed water. The gels were heated further to 700° C. at a heating rate of 60° C. per hour and maintained at 700° C. for 20 hours to remove carbon and ammonium chloride. The gel was heated to 1000° C. at a heating rate of 60° C. per hour while $Cl_2$ gas and He gas flowed through the oven at rates of 0.4 liter/minute and 1.6 liter/minute, respectively, in order to remove OH groups. Then $O_2$ gas flowed through the oven at a rate of 1 liter/minute. The gel was maintained at 1000° C. for 10 hours, heated to 1050° C. at a heating rate of 60° C. per hour and maintained at 1050° C. for 10 hours in order to remove chlorine.

The pressure in the container was reduced to 1 Torr or less using a rotary pump and the gel was heated to 1300° C. at a heating rate of 60° C. per hour and maintained at 1300° C. for 3 hours to close the pores in the gel. The finished transparent glass tubes had 2.5 cm outer diameter, 1.3 cm inner diameter and 50 cm length. No gels broke in the sintering process and 20 silica glass tubes were obtained. Yield: 100%

The silica glass tubes had mirror finishes on the inner and outer surfaces, a roundness of 1.9μ and a straightness of 0.1 mm. The coeccentricity of the outer and inner circumference was 1.5μ. No foreign matter was included in the glass.

The maximum amount of OH groups in the silica glass was 1 ppm. Even when the glass was heated to 2000° C. and melted using a ring heater, no foaming was observed and the silica glass tubes were of high quality.

By preparing large silica glass tubes by placing a sol solution into a rotating cylinder with a non-miscible liquid having a higher specific gravity than the sol solution in accordance with the invention, the resulting tubes have mirror-like surfaces of excellent dimensional precision. The silica glass tubes prepared by this method also have excellent optical properties. The process also provides good production yield. Accordingly, support tubes of preforms for optical fibers and jacket tubes can be provided at low cost. Additionally, silica glass tubes including fluorine and having a low refractive index which are used as clad tubes can also be provided at low cost.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed:

1. A method of preparing tubular silica glass, comprising;
    preparing a sol of a metal alkoxide hydrolyzed with an acid catalyst;
    adding ultrafine particles of silica to the sol to yield a sol solution;
    placing the sol solution into a cylindrical container;
    placing a liquid having a specific gravity higher than the specific gravity of the sol solution into the cylindrical container, said liquid having a higher specific gravity being immiscible with the sol solution, does not dissolve the sol solution and in which the sol solution does not dissolve;
    gelling the sol solution by rotating the container about the cylindrical axis to form a tubular wet gel;
    drying the tubular wet gel to a dry gel; and,
    sintering the dry gel to yield tubular silica glass.

2. The method of claim 1, wherein the high specific gravity liquid is a halogen-containing organic compound with the halogen atoms on the same or adjacent carbon atoms.

3. The method of claim 1, wherein the solution having a specific gravity higher than the specific gravity of the sol solution is selected from the group consisting of FLOURINERT, tetrachlorodifluoroethane, trichlorotrifluoroethane, carbon tetrachloride, tetrachloroethylene, bromoform, dibromoethane, diiode methane and mixtures thereof.

4. The method of claim 1, further comprising;
    extracting the high specific gravity liquid from the cylindrical container after the sol solution is gelled to a tubular wet gel and;
    filling the container with an aqueous alcohol solution prior to drying the tubular wet gel.

5. The method of claim 4, wherein the aqueous alcohol solution is a solution of water and a simple alcohol having between about one and ten carbon atoms.

6. The method of claim 5, wherein the alcohol is ethanol.

7. The method of claim 1, wherein the rotation of the rotating cylindrical container is controlled so that the maximum centrifugal force to which the sol solution is subjected is less than about 1,000 G (G=980 cm/second$^2$).

8. The method of claim 1, wherein rotation of the tubular wet gel is continued after the sol solution is gelled.

9. The method of claim 8, wherein rotation is continued for a period between about 30 minutes and 30 hours.

10. The method of claim 8, wherein the rotation rate is at least about 0.1 rotations per minute.

11. The method of claim 1, wherein the tubular wet gel is rotated while being dried.

12. The method of claim 11, wherein the rotation rate is between about 1 rotation per day and 100 rotations per minute.

13. The method of claim 1, wherein the metal alkoxide is silicon alkoxide having the general formula Si(OR)$_4$ wherein R is an alkyl group having one to six carbon atoms.

14. The method of claim 13, wherein the silicon alkoxide is silicon ethoxide.

15. The method of claim 1, wherein the ultrafine particle silica is added to the acid hydrolyzed metal alkoxide solution in an amount from about 0.2 to 5 mols of silica per mol of metal alkoxide.

16. The method of claim 1, wherein the ultrafine particles of silica are selected from the group consisting of white carbon obtained by hydrolyzing $SiCl_4$ using an oxygen-hydrogen flame burner, ultrafine particle silica obtained by a dry method using sodium silicate and ultrafine particle silica obtained by hydrolyzing silicon alkoxide with a basic catalyst.

17. The method of claim 1, wherein the ultrafine particle silica is fumed silica obtained by hydrolyzing silicon alkoxide with a basic catalyst and concentrating the solution of silicon alkoxide hydrolyzed with a basic catalyst to increase the silica concentration.

18. The method of claim 1, wherein ultrasonic vibration is applied to the sol solution to which ultrafine particles of silica have been added in order to uniformly disperse the ultrafine particles of silica in the sol solution.

19. The method of claim 1, wherein the pH of the sol solution is adjusted to between about 3 and 6 by addition of a base.

20. The method of claim 1, wherein sintering the dry gel includes (1) removing absorbed water, (2) removing carbon and (3) making the dry gel non-porous.

21. The method of claim 20, wherein absorbed water is removed by at least one step of heating the dry gel to a first selected temperature between about 20° and 400° C. at a rate of less than about 400° C. per hour and maintaining said dry gel at the first selected temperature for at least one hour.

22. The method of claim 20, wherein carbon is removed by at least one step of heating the dry gel to a second selected temperature between about 400° and 1100° C. at a heating rate of between about 50° and 400° C. per hour and maintaining the dry gel at said second selected temperature for at least 3 hours.

23. The method of claim 20, wherein the dry gel is made non-porous by at least one step of heating the dry gel to a third selected temperature between about 1000° and 1400° C. at a heating rate between about 50° and 400° C. per hour.

24. The method of claim 20, wherein the step of removing carbon is at least partially performed in an atmosphere including oxygen.

25. The method of claim 20, wherein the step of making the dry gel non-porous is at least partially performed under vacuum.

26. The method of claim 20, wherein the step of making the dry gel non-porous is at least partially performed in a helium atmosphere.

27. The method of claim 20, wherein sintering is at least partially performed in an atmosphere including an OH group removing agent.

28. The method of claim 1, wherein the dry gel is sintered by heating the dry gel in an atmosphere selected from the group consisting of oxygen and an inert gas containing oxygen, heating the oxidized dry gel in an atmosphere including OH group removing agent and sintering the dry gel from which OH groups have been removed in a vacuum or in a helium atmosphere at least until the fine pores at the surface of the gel are closed.

29. The method of claim 28, wherein the sintering process further includes the step of heating the dry gel in an atmosphere selected from the group consisting of oxygen and an inert gas containing oxygen after heating the oxidized dry gel in an atmosphere containing an OH group removing agent.

* * * * *